INVENTOR:
DEREK ANTHONY RUSH

ATTORNEYS:
Moore, Hall + Pollock

INVENTOR:
DEREK ANTHONY RUSH

ATTORNEYS:
Moore, Hall + Pollack

INVENTOR:
DEREK ANTHONY RUSH
ATTORNEYS:
Moore, Hall + Pollack

INVENTOR:
DEREK ANTHONY RUSH

ATTORNEYS:
Moore, Hall + Pollack

United States Patent Office 3,361,897

Patented Jan. 2, 1968

3,361,897

DIGITAL APPARATUS TO CORRECT FOR ATTITUDE ERRORS IN AIRCRAFT FUEL-GUAGE MEASUREMENTS

Derek Anthony Rush, Stroud, England, assignor to S. Smith & Sons (England) Limited, London, England, a British company Filed Apr. 29, 1964, Ser. No. 363,413
Claims priority, application Great Britain, Apr. 30, 1963, 16,956/63
17 Claims. (Cl. 235—150.21)

ABSTRACT OF THE DISCLOSURE

To provide for correction of attitude-errors in aircraft fuel-guage measurements, correction values applicable to different combinations of fuel-content and aircraft attitude are stored in a data storage device. Aircraft attitude and tank fuel-content are measured, and means are provided for reading out a particular correction value from the data storage device consistent with the appropriate combination of measured attitude and fuel-content values. Digital representations of the measured fuel-content and attitude are used together to constitute the address in the storage device from which the appropriate correction value is read out, the two digital representations constituting more- and less-significant blocks of digits of the address-word.

This invention relates to digital systems of the kind for providing an output representation of the value of a predetermined variable where said value is dependent upon the values of a plurality of other variables.

According to the present invention a digital system for providing an output representation of the value of a predetermined variable where said value is dependent upon the values of a plurality of other variables, comprises a plurality of means which are arranged to be responsive respectively to said other variables to provide digital representations of the values of said other variables, a digital data store having a multiplicity of locations for storing digital representations of values of said predetermined variable that are appropriate to a multiplicity of different combinations of values of said other variables, and means which is arranged to be responsive to said digital representations of the values of said other variables as together characterising the address within the store of one of said storage locations to read out from the store the digital representation which is stored at that storage location, the arrangement being such that the digital representation which is read out from the store as aforesaid is representative of the value of said predetermined variable appropriate to the represented values of said other variables.

The system may be arranged to provide representations of the values of a plurality of predetermined variables one at a time and in turn. In this case at least one of said plurality of means for providing digital representations may be arranged to provide in turn digital representations of the values of a plurality of different input variables upon which the different predetermined variables are respectively dependent.

At least one of said plurality of means for providing digital representations may comprise electrical measuring means arranged to be responsive to a respective one of said other variables to supply an electric signal having an amplitude that provides a measure of the value of the relevant variable, and an electrical analogue-to-digital converter for providing an electrical digital-representation of the amplitude of said signal. In the latter case it may be arranged that the analogue-to-digital converter is time-shared between a plurality of electrical measuring means, electric signals supplied to the converter by the different measuring means having amplitudes that provide measures of different variables, so that digital representations of the values of these different variables are provided sequentially by the analogue-to-digital converter.

The digital data store may be a sequential-access or random-access store. The data is preferably stored by means of magnetic tape, magnetic drum or magnetic disc, but other storage media such as for example magnetic cores, punched cards and punched paper tape may be used.

It may be arranged that the digital representations stored at the different storage locations of the store are available for reading out during different periods in a recurring timing cycle, and that a counter provides during each period a count characteristic of the address within the store of the digital representation which is currently available for reading out. In these circumstances the system may include a digital comparator for comparing during each period of the address characterised by the count of the counter with the address characterised as aforesaid by the digital representations of said other variables, the arrangement being such that the digital representation which is available for reading out from the store is read out only in response to equivalence between the compared addresses.

The present invention is particularly, although not exclusively, applicable to the provision of a representation which is dependent upon the error in a measure of the content of a liquid-fuel storage tank of an aircraft, or other craft, where the measurements provided by the fuel-content measuring apparatus of the craft are subject to error arising from change in attitude of the craft.

According to a feature of the present invention a digital system for use in a craft having a liquid-fuel storage tank, comprises means for providing a digital representation which is dependent upon a measure of the fuel-content of the tank, means for providing a digital representation which is dependent upon attitude of the craft, a digital data store having a multiplicity of locations for storing digital representations of values appropriate to correction, or partial correction, of said measure of fuel-content for a multiplicity of different combinations of conditions of said measure and craft attitude, and means which is arranged to be responsive to the digital representations of fuel-content and craft-attitude as together characterising the address within the store of one of said storage locations to read out from the store the digital representation which is stored at that storage location, the arrangement being such that the digital representation which is read out as aforesaid is representative of the value appropriate to at least partial correction of the measure of fuel-content in the appertaining conditions of said measure and craft attitude.

The digital representation dependent upon attitude of the craft may be dependent upon angular measure of craft attitude, and may comprise two groups of digits, the two groups being representative respectively of angular measures of craft attitude about two mutually perpendicular axes. In the latter case the two groups of digits may be representative of angular measures of pitch and roll respectively.

A visual indication of the value represented by the representation which is read out from the store may be provided, and in this case the representation which is read out may be supplied to a digital-to-analogue converter which is coupled to an analogue indicating device so that the indicating device provides a visual indication of the appropriate correction or partial correction, as the case may be. Alternatively, it may be arranged that the value represented by the representation which is read out is used in conjunction with said measure of fuel-content to provide a representation of an appropriately corrected value of fuel-content.

In the case of a craft having a plurality of liquid-fuel storage tanks, means may be arranged to provide digital representations of the fuel-contents of the different tanks in turn. In this case the arrangement may be such that the system provides, one at a time and in turn, digital representations of the corrections or partial corrections, as the case may be, which are appropriate to the different tanks.

A digital system in accordance with the present invention will now be described, by way of example, with reference to the accompanying drawings. The system to be described is for use in an aircraft having seven liquid-fuel storage tanks, and provides digital representations of corrections which are applicable to measures of fuel-content provided by fuel-content measuring apparatus of the aircraft.

Figure 1:
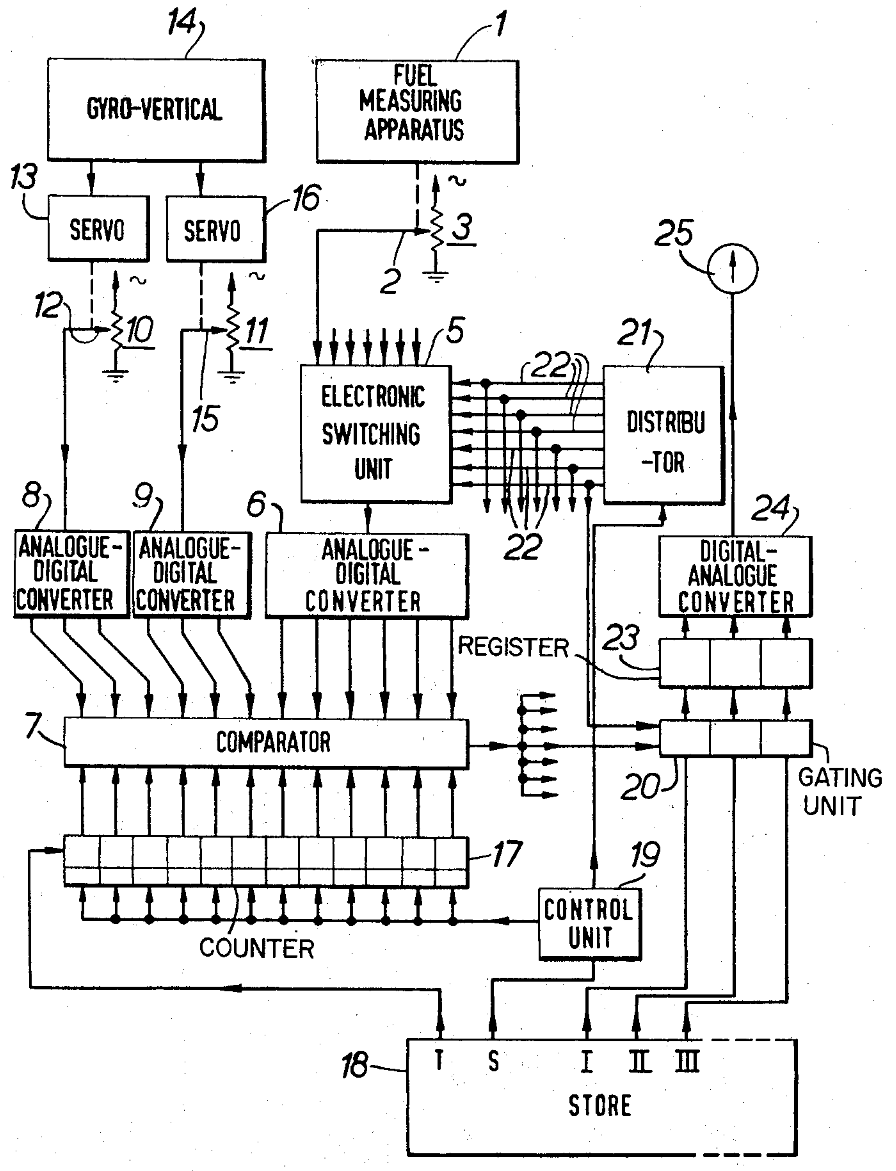
FIGURE 1 is a block schematic representation of part of the digital system.

Referring to FIGURE 1, liquid-fuel measuring apparatus 1 is arranged to measure the fuel content of a first of the seven fuel storage tanks (not shown) of the aircraft, and provides by means of a conventional dial and pointer or cyclometer display (not shown) an indication of the measured content. The apparatus 1 in addition controls by means of a mechanical coupling the position of a movable tap 2 of a potentiometer 3. The potentiometer 3 is supplied with alternating current of constant amplitude, and the position of the tap 2 is controlled by the apparatus 1 so that the alternating current signal which is derived at the tap 2 has an amplitude dependent upon the measure of fuel content provided by the apparatus 1. The signal at the tap 2 is supplied to an electronic switching unit 5. (It may be found necessary in certain circumstances to remove from the signal supplied to the unit 5 harmonic frequency components, and to this end successive stages of demodulation, filtering and re-modulation may be included between tap 2 and unit 5.)

Each of the other six fuel storage tanks of the aircraft is provided with an individual content-measuring apparatus and associated potentiometer corresponding to the apparatus 1 and potentiometer 3. In each case it is arranged, as for said first fuel tank, that an alternating current signal which is dependent in amplitude upon the relevant measure of fuel content is supplied (filtered if necessary) to the switching unit 5.

The electronic switching unit 5 can have any one of seven settings, and is arranged to adopt the seven settings in sequence so as to supply the seven signals it receives in respect of the seven measures of fuel content, one at a time, and in turn, to an analogue-to-digital converter 6. The converter 6 provides a six-digit binary representation of the amplitude of the signal it receives from the unit 5. Signals representative of the values of the six binary digits of this representation are applied in parallel to a digital comparator 7 to form a first block of six digits of a twelve-digit binary word. Signals representative of the values of the second block of six digits of this word are supplied in parallel to the comparator 7 from two analogue-to-digital converters 8 and 9.

The analogue-to-digital converters 8 and 9 both provide three-digit binary representations, that provided by the converter 8 being representative of the amplitude of an alternating current signal it receives from a potentiometer 10, and that provided by the converter 9 being representative of the amplitude of an alternating current signal it receives from a potentiometer 11. The potentiometer 10 has a tap 12 which is positioned by a servo repeater 13 in accordance with a signal which is dependent upon pitch of the aircraft and which is supplied to the repeater 13 from a gyro-vertical 14 in the aircraft. The potentiometer 11 on the other hand has a tap 15 which is positioned by a servo repeater 16 in accordance with a signal which is dependent upon roll of the aircraft and which is also supplied to the repeater 16 from the gyro-vertical 14. The taps 12 and 15 of the potentiometers 10 and 11, which potentiometers are supplied with alternating electric current, are positioned centrally when the aircraft has its datum, level attitude, the alternating current signals supplied to the converters 8 and 9 from the taps 12 and 15 having amplitudes dependent respectively upon the angles (magnitude and sense) of pitch and roll of the aircraft. As a result, the values of the six digits of the said second block of digits conveyed to the comparator 7, are dependent upon the attitude of the aircraft in pitch and roll, whereas the values of the six digits of said first block are dependent upon the measure of fuel content in one of the seven fuel tanks, the particular one depending upon the setting of the switching unit 5.

The values of the twelve digits conveyed to the comparator 7 from the converters 6, 8 and 9, are compared in the comparator 7 with the values of corresponding digits of the count of a twelve-stage binary counter 17. The counter 17 counts pulses it receives at regular intervals from a "timing"-track T of a binary data store 18. The store 18 has twenty-four storage tracks, including the "timing"-track T and a "start"-track S, of which one is not used. The other twenty-one tracks I to XXI (of which only tracks I to III are indicated in FIGURE 1) provide 4,096×7 locations for the storage of three-digit numbers, such numbers being representative of the values of corrections that are applicable to the measures of fuel tank contents provided by the seven fuel-contents measuring apparatus 1 under differing combinations of conditions of fuel-content and aircraft attitude. The three-digit numbers appropriate to the different tanks are stored in different groups of three adjacent tracks, those for the first tank being stored in the tracks I to III and those for a second tank being stored in the tracks IV to VI, and so on. The three tracks appropriate to any tank provide 4,096 storage locations for three-digit numbers, the three digits of each number being stored in corresponding positions of the three tracks respectively.

The store 18 is a dynamic store in the sense that all data stored therein effectively recirculates continuously, and becomes available for reading out (non-destructively) once every recirculation cycle. The digits stored in each track I to XXI become available for reading out in turn, so that seven three-digit correction numbers, appropriate to the seven tanks respectively, are available for reading out during any one of 4,096 timing periods of the recirculation cycle. The numbers stored in the 4,096 locations of each group of three tracks become available for reading out in successive timing periods of the cycle, so that the address of any one of these locations in the store 18 is characterised by the period during which the number stored in the location is available for reading out.

At the beginning of each recirculation cycle of the store 18 the counter 17 is reset to ZERO count by means of a pulse which is supplied to the counter 17 from a control unit 19. This pulse, which originates from a binary ONE stored in the start-track S of the store 18, has the effect of ensuring that the counter 17 is reset positively, at the beginning of each cycle. After the start-pulse there is a "dead" period of the cycle during which the converters 6, 8 and 9, settle to the states representative of their input analogue signals. During the ensuring timing periods of the cycle the converters 6, 8 and 9 remain static.

During the first timing period of the cycle, the "ZERO" period, for which the count of the counter 17 remains at ZERO, the three-digit number stored at the first storage location, address "ZERO," of each individual three-track group is available for reading out. When the seven three-digit numbers at the next location, address "ONE," become available during the next timing period, the count of the counter 17 is increased to ONE by means of a pluse applied to the counter 17 from the track T. Similarly, a pulse is supplied to the counter 17 from the track T, so as to increase the count by unity, each time the three-digit numbers of the next successive location becomes available for reading out. In this way the counter 17 provides an up-dated representation characteristic of the address of the location which stores the seven correction numbers that are presently available for reading out in respect of the seven tanks respectively.

The twelve-digit count of the counter 17 is compared in the comparator 7 (throughout the cycle of the store 18) for equivalence with the twelve-digit word represented by the number which is then available for reading out. This sentation provided by the converters 6, 8 and 9 is taken as being characteristic of a particular address in the store 18. Accordingly when equivalence is detected by the comparator 7 it supplies a pulse, an "equivalence" pulse, to each of seven read-out gating units, of which only one, gating unit 20, is shown. The gating unit 20 is arranged so as to be capable of reading out, as they become available for reading out in turn, the three-digit numbers stored by the group of tracks I, II and III of the store 18, that is to say, the correction numbers appropriate to said first tank. The other six gating units are correspondingly arranged to be capable of reading out the correction numbers appropriate to the six other tanks respectively.

Although the "equivalence" pulse is supplied to all seven gating units 20, only one of these gating units is in fact opened by this pulse to effect read-out. The particular one of the gating units 20 which is opened is dependent upon which receives an enabling signal from a distributor 21. The distributor 21 has seven states and is switched from one state to the next in a recurring sequence by pulses supplied to it from the control unit 19. These pulses from the control unit 19 are the same as used to reset the counter 17 at the beginning of each store-cycle, and accordingly the distributor 21 remains in the same state throughout each store-cycle and is switched to its next state in response to the beginning of each new cycle. The particular one of the seven states occupied by the distributor 21 determines to which of seven leads 22 the enabling signal is supplied. The seven leads 22 are connected to different ones of the seven gating units 20 and also to the switching unit 5. The particular one of the leads 22 to which the enabling signal is supplied determines which "fuel-measure" signal is supplied to the converter 6 by the switching unit 5, and also which of the gating units 20 is enabled for reading out a correction number from the store 18. The "fuel-measure" signal supplied to the converter 6, and the correction number subsequently read out relate to the same tank. Thus, for example, supply of the enabling signal to the lead 22 connected to the gating unit 20, sets the switching unit 5 to select the "fuel-measure" signal of the said first tank.

While the gating unit 20 is being supplied with the enabling signal it is responsive to the "equivalence" pulse when supplied by the comparator 7 to read out from tracks I, II and III of the store 18 the three digits of the number which is then available for reading out. This number which is the correction number stored in respect of the first tank at the address represented by the twelve-digit word conveyed to the comparator 7, is conveyed by the gating unit 20 to an individual three-stage binary register 23. The register 23 stores the number read out, and conveys the values of its three digits to a digital-to-analogue converter 24. The converter 24 supplies to an indicating device formed by a moving coil meter 25, an electric direct current signal having a current magnitude dependent upon the value of the binary number stored by the register 23. Thus the meter 25 provides a visual analogue representation of the correction number read out in respect of said first tank.

The correction number is stored by the register 23 until another (or the same) correction number is read out in respect of said first tank, that is to say until the distributor 21, after six store-recirculation cycles have elapsed, again supplies the enabling signal to the gating unit 20. Thus the meter 25, which is conveniently positioned in the aircraft for viewing by the pilot or flight engineer, provides a continuous indication of the correction number appropriate to said first tank, change in the indication resulting only from change in measured fuel-content or aircraft attitude.

The six other gating units which correspond to the gating unit 20 are each provided with a register, a digital-to-analogue converter, and a meter corresponding respectively to the register 23, the converter 24, and the meter 25, associated with the unit 20. The time-sharing effected by the switching unit 5 under the control of the distributor 21 ensures that correction numbers appropriate to at least partial correction of the fuel-measures provided by the seven different contents-measuring apparatus 1 of the aircraft, are presented to the seven different registers in recurring sequence. Accordingly, the system provides in respect of each tank a continuous visual indication of the correction which is applicable to the measure of fuel-content as this is indicated by the conventional dial-and-pointer or cyclometer display (not shown) in the aircraft.

The values of the correction numbers which in any particular case are to be stored in the store 18 for use, as described above, in the indication of fuel gauge correction, are obtained empirically. Where there is sufficient consistency in construction of the fuel tanks, the values might alternatively be derived on a semi-theoretical basis. The empirical method however, has the advantage that the correction values derived will take into account errors in the system other than those arising from attitude change.

Since it is envisaged that it will be necessary to make changes in the values of the correction numbers from time to time, it is preferred to provide in the system means (not shown) whereby new numbers may be readily written in the store 18. The writing means is preferably arranged so that it may be readily coupled to external calibration equipment having manually-operable keys for setting up the numbers which are to be written in.

The corrections displayed by the indicator 25 may be in terms of volume or mass. In either case, the measure of fuel-content provided by the signal from the potentiometer tap 2 is preferably in terms of volume. If the correction is to be in terms of mass then in normal circumstances it is small enough for a nominal value of fuel density to be used in scaling the correction values that are stored in the store 18.

The store 18 may be a magnetic tape store having an endless belt of magnetic tape acting as the storage medium. As alternatives to a magnetic-tape store, magnetic-drum and magnetic-disc stores are preferred.

The liquid-fuel measuring apparatus 1 for said first tank (and the corresponding apparatus for each other tank) may be for example of the kind described in British patent specification No. 695,074, in which the measure of tank-content is provided in dependence upon a measurement of electrical capacitance. In the two forms of apparatus which are described in patent specification No. 695,074 with reference to FIGURES 1 and 3 of that specification, an electric motor positions a potentiometer tap in accordance with the measure of fuel mass. When such apparatus is used in the arrangement described above with reference to FIGURE 1 of the present drawings, and the potentiometer tap 2 is to be positioned in terms of fuel volume, the drive to the potentiometer tap 2 is preferably made via a converter unit (not shown) which makes the necessary conversion from mass to volume. The converter unit may, for example, be a servo system which is driven in accordance with a signal derived from a potentiometer pick-off driven by the motor and a signal dependent upon fuel density and derived from an immersed reference capacitor.

Figure 2:
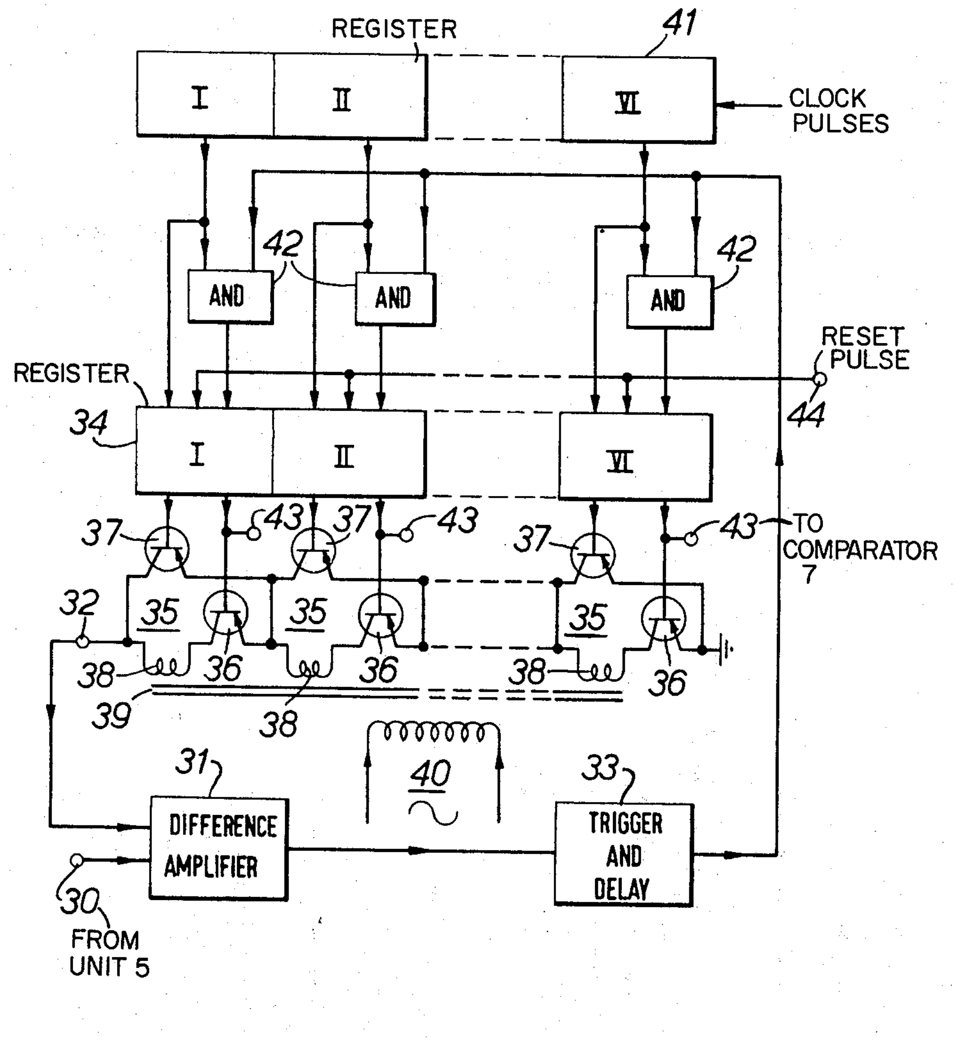
FIGURE 2 shows partly in block schematic form the arrangement of an analogue-to-digital converter suitable for use in the digital system.

The analogue-to-digital converter 6 may be as shown in FIGURE 2 of the accompanying drawings.

Referring to FIGURE 2, the electric analogue alternating current signal which is supplied by the switching unit 5 (FIGURE 1) is received at an input terminal 30. The signal at the terminal 30 is applied to a "difference" amplifier 31 together with an alternating current signal from a terminal 32. The amplifier 31 acts to compare the amplitudes of the signals from the terminals 30 and 32, and supplies to a trigger and delay unit 33 a signal which is of one predetermined sense only when the amplitude of the signal at the terminal 32 exceeds that at the terminal 30.

The amplitude of the signal at the terminal 32 is an analogue representation of a six-digit binary number stored by a six-stage register 34, and the converter operates to change the values of the digits stored in the register 34 in accordance with the result of the comparison effected by the amplifier 31. The six stages I to VI of the register 34 are initially all set to the ZERO state, and are then set one at a time and in descending order of significance (VI to I), to the ONE state, the signal at the terminal 32 being compared at each step in the process with the signal at the terminal 30. The stage which was last set to the ONE state is reset to the ZERO state if during any step in the process the amplifier 31 supplies to the unit 33 the signal of said one predetermined sense (that is to say, if the amplitude of the signal at the terminal 32 exceeds that at the terminal 30). In this way the final number stored by the register 34 provides the required six-digit representation of the analogue input. It will be appreciated that the above-described operation of obtaining this final number is necessarily executed in the "dead" period of each cycle of the store 18 (FIGURE 1), that is to say prior to the period in each cycle when the correction numbers are available for reading out and the comparison of address representations takes place in the comparator 7.

The analogue signal at the terminal 32 is provided by six interconnected switch units 35 which are responsive to the states of the stages I to VI respectively, of the register 34. Each switch unit 35 includes two transistors 36 and 37 that are both associated with a respective one of six secondary windings 38 of a transformer 39. A primary winding 40 of the transformer 39 is excited with the same alternating current as used to derive the signal at the terminal 30; in the present case the winding 40 is excited from the same source as the potentiometer 3 of FIGURE 1. The different secondary windings 38 have different numbers of turns, the different numbers of turns, when taken in the order with which they apply in association with stages I to VI respectively of the register 34, being in the following proportional relationship to one another:

$$1:2:4:8:16:32$$

As a result, the amplitude of the signal which appears across any individual winding 38 is weighted in accordance with the significance of the associated register stage.

Each secondary winding 38 is connected in series with the emitter-to-collector current path of its associated transistor 36, the serially connected winding 38 and transistor 36 being shunted by the emitter-to-collector current path of the individually associated transistor 37. The six sets of serially-connected windings 38 and transistors 36 shunted by transistor 37, are connected in series with one another between ground and the terminal 32. Within each switch unit 35, the transistor 36 is conductive only when the state of the respectively associated stage of the register 34 is ONE, whereas the transistor 37 is conductive only when the state is ZERO. As a result therefore, the amplitude of the alternating current signal that appears at the terminal 32 is weighted in accordance with the values of the digits represented by the stages I to VI of the register 34.

The six stages I to VI of the register 34 are set in turn from their ZERO states to their ONE states by means of a six-stage shift register 41. Signals representative of the states, ZERO or ONE, of the individual stages I to VI of the register 41 are supplied respectively to the six stages I to VI of the register 34, and also to six AND gates 42. A binary ONE is shifted from one stage to the next (in the order stages VI to I) of the register 41 by means of clock pulses (of a pulse recurrence rate which is higher than the rate of change of the signal being sampled) supplied from a source not shown. As the binary ONE is shifted into each stage of the register 41 it causes a change in the signal supplied to the corresponding stage of the register 34, with the result that the latter stage is switched to the ONE state. This produces a corresponding increase in the amplitude of the signal at the terminal 32. If this increased amplitude exceeds the amplitude of the input signal at the terminal 30, then the amplifier 31 supplies the signal of said one predetermined sense to the trigger and delay unit 33.

The trigger and delay unit 33 includes a monostable trigger circuit which is triggered from its stable state by the signal of said one predetermined sense supplied from the amplifier 31. After a short delay the trigger cricuit returns to its stable state, and a pulse is then supplied from the unit 33 to each of the six AND gate 42. Only one of the AND gates 42 passes this pulse, the particular one being that associated with the particular stage of the register 41 which is then storing the binary ONE. The pulse passed by this gate 42 is applied to reset that one of the stages I to VI of the register 34 which was last set of to the ONE state. This resetting has the effect of reducing the amplitude of the signal appearing at the terminal 32 so that it is again less than the amplitude of the signal at the terminal 30.

If after any stage of the register 34 is set to the ONE state the amplitude of the signal at the terminal 32 is less than that at the terminal 30, the monostable trigger circuit of the unit 33 is not triggered and there is in consequence no resetting of that stage to the ZERO state.

After all six stages I to VI of the register 34 have been set in accordance with the above process, the value of the digit stored by each such stage is represented by the potential with respect to ground of a respective terminal 43. The six signals applied to the comparator 7 of FIGURE 1 are accordingly signals derived from the six terminals 43.

The six stages I to VI of the register 34 are all reset to the ZERO state, prior to the shifting of the binary ONE through the six stages of the shift register 41, by means of a reset pulse applied to a terminal 44. This reset pulse may be the same as that which is used to reset the counter 17 of FIGURE 1, and this same pulse may in fact be used, after being delayed by a short period, to initiate the entry of the binary ONE into stage VI of the register 41.

The converters 8 and 9 may of course be of basically the same form as the converter described above with reference to FIGURE 2.

Figure 3:
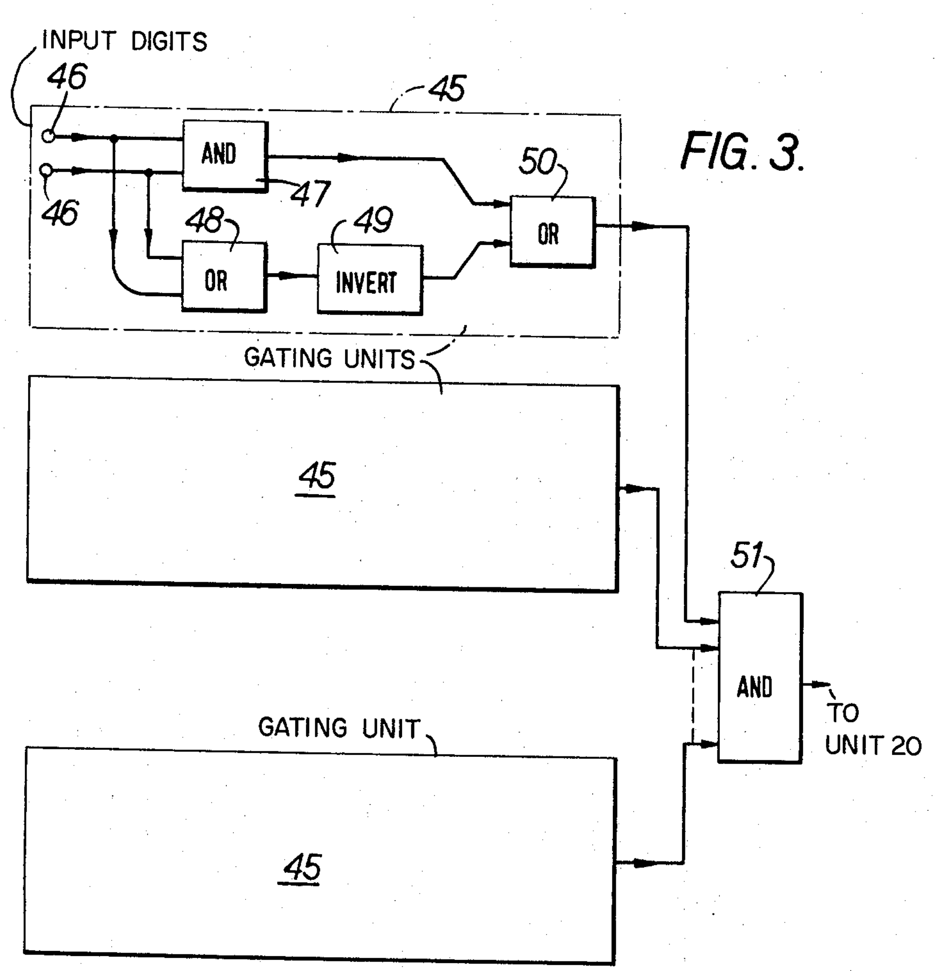
FIGURE 3 shows in block schematic form the arrangement of a digital comparator suitable for use in the digital system.

The comparator 7 of FIGURE 1 may be constructed as shown in FIGURE 3.

Referring to FIGURE 3, twelve gating units 45 are provided for comparing for equivalence the values of corresponding digits of the two twelve-digit words represented by the converters 6, 8 and 9, and the counter 17. Each gating unit 45 has two input terminals 46 to which the values of a pair of digits are respectively conveyed, the values conveyed to the two terminals 46 being those appropriate to the two digits in corresponding digital places in the two words. Each terminal 46 is at a potential which is negative with respect to ground when the relevant input digit of the pair is ONE and at ground potential when the digit is ZERO. An AND gate 47 within each unit 45 supplies a signal which is negative with respect to ground only when both input digits are ONE, whereas an OR gate 48 supplies a signal which is negative with respect to ground when either (or both) of the input digits is ONE. The output signal of the OR gate 48 is supplied to an inverter 49 so that the inverter 49 supplies a signal which is negative with respect to ground only when neither of the input digits is ONE, that is to say when both are ZERO. An OR gate 50 is responsive to the negative signal as supplied by the AND gate 47 or the inverter 49, to supply a signal that is negative with respect to earth to an AND gate 51. Accordingly, a negative signal is supplied to the gate 51 from the gate 50 when the input digits are both ONE or both ZERO, that is to say, when there is equivalence between the two input digits. The AND gate 51 is common to all twelve units 45 and supplies an output signal only when equivalence between the pairs of input digits is detected in all twelve units 45.

Figure 4:
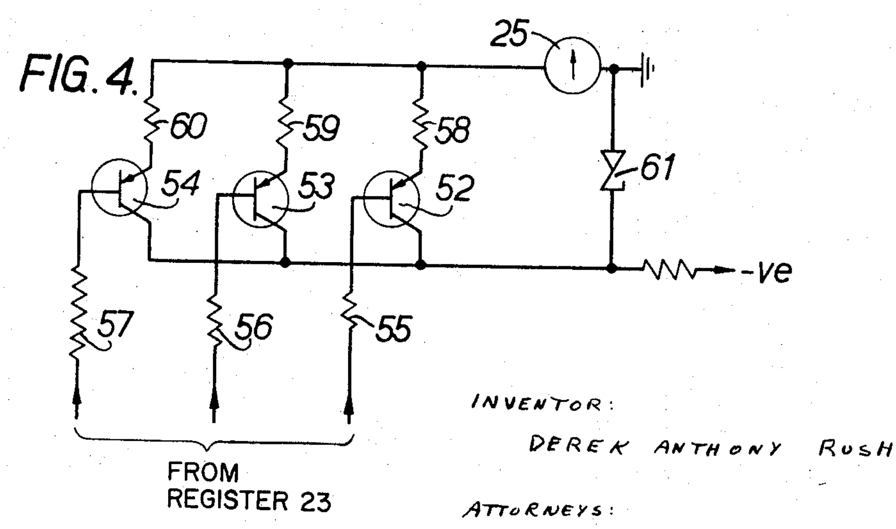
FIGURE 4 shows the circuit arrangement of a digital-to-analogue converter suitable for use in the digital system.

The digital-to-analogue converter 24 of FIGURE 1 may be as shown in FIGURE 4.

Referring to FIGURE 4, signals representative of the values of the three digits stored by the register 23 (FIGURE 1) are applied to the base electrodes of three transistors 52, 53 and 54 via three resistors 55, 56 and 57 respectively. The emitter-to-collector current paths of the transistors 52, 53 and 54 are connected in series with respective resistors 58, 59 and 60 such as to provide three paths via which direct current can be supplied to the moving coil (not shown) of the meter 25. Stabilisation of the voltage of the direct current supply is achieved by means of a Zener diode 61.

The signals applied to the base electrodes of the transistors 52, 53 and 54 are representative respectively of the values of the most significant, second most significant, and least significant digits of the number stored by the register 23 (FIGURE 1). The transistors 52, 53 and 54 conduct only when the signals applied to their respective base electrodes are representative of ONE. The extent of the conduction is determined in each case by the value of the relevant base-circuit resistor 55, 56 or 57. The values of the resistors 55, 56 and 57 are in ratios:

1:2:4 so that the currents passed by the transistors 52, 53 and 54 are weighted in accordance with the significances of the relevant digits of the stored number. Thus the sum of the currents passed by the transistors 52, 53 and 54 and supplied to the meter 25 is representative of the number stored by the register 23 (FIGURE 1).

The distributor 21 may be a seven stage binary shift register in which a binary ONE is shifted from one stage to the next in response to each pulse from the control unit 19, the last stage of the register being coupled to the first so that the ONE is recirculated.

Although in the arrangement described above with reference to the accompanying drawings, the correction numbers are three-digit numbers it will be appreciated that more than three-digits may be used. In addition, although the arrangement described above is time-sharing in order to provide information relating to each of seven tanks, it will be appreciated that this is not essential and that an increase in the information rate in respect of a tank can be obtained if time-sharing is not used. Furthermore, although the variables which are used to characterise each correction number are the measure of content and the aircraft attitude in pitch and roll, other variables may be used. Instead of using a representation of aircraft attitude in terms of pitch and roll, use may be made of a representation of the orientation of the liquid surface as this varies in accordance with maneuver of the aircraft. Such a representation may be derived from an output signal of an accelerometer mounted in the aircraft. The attitude representation may however be derived from an output signal of another device such as an inclinometer or pendulum mounted in the aircraft.

The above-described arrangement may be modified in that the word represented by the output signals from the converters 6, 8, and 9, may be written into the twelve-stage binary counter 17 and the timing pulses may each be used to reduce the count by unity. In this case there is no need for the comparator 7, the signal which in this case is used to open the relevant one of the gating units 20 (in place of the equivalence signal from the comparator 7) being derived from a unit (not shown) which is responsive to the condition in which the count of the counter 17 has been reduced to zero.

With the system described above the correction which is applicable to each fuel tank is displayed for use by the aircrew in conjunction with the indication of fuel-content provided by the fuel measuring apparatus 1. However, rather than displaying the correction, it may be used actually to correct the indication of fuel-content. The manner in which the system of FIGURE 1 may be modified to apply the correction for this purpose will be described with reference to FIGURE 5.

Figure 5:
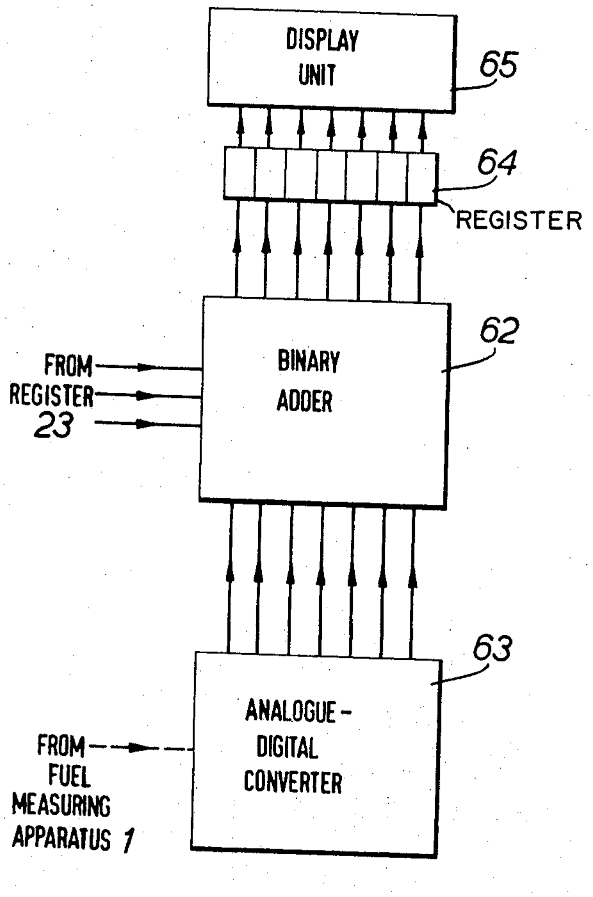
FIGURE 5 shows in block schematic form an arrangement which is for use in a modification of the system of FIGURE 1.

In FIGURE 5 the modification which is required in respect of only one tank, the said first fuel tank, is shown. It will however be appreciated that the modification may be applied to all seven tanks and that in these circumstances economy in the extra equipment involved may be obtained by suitable use for time-sharing techniques.

Referring to FIGURE 5, a binary adder 62 receives from the register 23 the three signals which are together read out of the store 18 in respect of said first tank. In addition, the binary adder 62 receives from an analogue-to-digital converter 63 seven signals that together provide a seven-digit binary representation of the measure of fuel-content provided by the fuel measuring apparatus 1. This seven-digit representation is provided by the converter 62 in response to an analogue representation of fuel-content conveyed from the apparatus 1.

The three-digits of the correction number provided by the register 23 are of the same significance as the three least-significant digits of the seven-digit number represented by the converter 63, and the binary adder 62 acts to sum the two numbers accordingly. A digital representation of the sum is conveyed from the adder 63 to a register 64, so that the register 64 stores as a binary representation the value of the corrected measure of fuel-content. This value is conveyed to a display unit 65 which provides a visual indication of it either in digital or analogue form.

If the corrected measure of fuel-content is displayed in digital form the unit 65 preferably includes a binary-to-decimal converter (not shown) so that the number is displayed in decimal rather than binary form.

I claim:

1. A digital system for providing an output representation of the value of a predetermined variable where said value is dependent upon the values of a plurality of other variables, comprising a plurality of means responsive respectively to said other variables to provide digital representations of the values of said other variables, a digital data store having a multiplicity of addressable locations for storing digital representations of values of said predetermined variable that are appropriate to a multiplicity of different combinations of values of said other variables, and means jointly responsive to said digital representations of the values of said other variables acting together to constitute the address of one of said storage locations for reading out from the store the digital representation which is stored at that storage location, the digital representation which is read out from the store as aforesaid being representative of the value of said predetermined variable appropriate to the represented values of said other variables.

2. A digital system according to claim 1 wherein at least one of said means for providing digital representations comprises means for providing digital representations of the values of a plurality of different input variables in turn, the system including means for providing, one at a time and in turn, digital representations of a plurality of different predetermined variables which are respectively dependent upon the values of said input variables.

3. In an aircraft, a digital system according to claim 1 wherein said means responsive to said other variables includes means responsive to attitude of the aircraft to provide a digital representation dependent upon said attitude.

4. A digital system according to claim 3 wherein said digital representation dependent upon attitude comprises a plurality of groups of digits, the different groups being representative of angular measures of attitude about different axes.

5. In an aircraft having a liquid-fuel storage tank, a digital system according to claim 1 wherein said means responsive to said other variables includes means responsive to the fuel-content of said tank to provide a digital representation of said fuel-content.

6. A digital system according to claim 1 wherein said store is a dynamic store for presenting the digital representations stored at consecutive storage locations available for reading out during successive periods in a recurring timing cycle, and a counter responsive to the timing cycle of the store to provide during each said period a count characteristic of the address within the store of the digital representation which is currently available for reading out.

7. A digital system according to claim 6 including a digital comparator to compare during each said period the address characterised by the count of said counter with the address characterised as aforesaid by the digital representations of said other variables to supply an equivalence signal in response to equivalence between the compared addresses, and means responsive to said equivalence signal to read out from the store the digital representation which is then currently available for reading out from the store.

8. A digital system according to claim 1 wherein at least one of said plurality of means for providing digital representations comprises electrical measuring means responsive to a respective one of said other variables to supply an electric signal having an amplitude that provides a measure of the relevant variable, and an electrical analogue-to-digital converter for providing an electrical digital-representation of the amplitude of said signal.

9. A digital system according to claim 8 including a plurality of electrical measuring means for supplying electric signals having amplitudes that provide measures of different variables, and time-sharing means for supplying said electric signals in sequence to said analogue-to-digital converter so that said converter provides digital representations of the values of the different variables sequentially.

10. A digital system for use in a craft having a liquid-fuel storage tank, the system comprising means for providing a digital representation which is dependent upon a measure of the fuel-content of the tank, means for providing a digital representation which is dependent upon attitude of the craft, a digital data store having a multiplicity of addressable locations for storing digital representations of values appropriate to at least partial correction of said measure of fuel-content for a multiplicity of different combinations of conditions of said measure and craft attitude, and means responsive to the digital representations of fuel-content and craft-attitude acting together characterize the address within the store of one of said storage locations for reading out from the store the digital representation which is stored at that storage location, the digital representation which is read out as aforesaid being representative of the value appropriate to at least partial correction of the measure of fuel-content in the appertaining conditions of said measure and craft attitude.

11. A digital system according to claim 10 including means for providing a visual indication of the value represented by the digital representation read out from the store.

12. A digital system according to claim 10 including means responsive to the measure of fuel-content and to the digital representation read out from the store, for providing a representation of an appropriately-corrected value of fuel-content.

13. A digital system according to claim 10 and for use in a craft having a plurality of liquid-fuel storage tanks, including means for providing digital representations of the fuel-contents of the different tanks in turn, the arrangement being such that the system provides, one at a time and in turn, digital representations of corrections which are appropriate to the different tanks.

14. A digital system according to claim 10 wherein means for providing a digital representation dependent upon attitude of the craft comprises means responsive to angular measure of craft attitude.

15. A digital system according to claim 14 wherein said digital representation dependent upon attitude comprises two groups of digits, the two groups being representative respectively of angular measures of craft attitude about two mutually perpendicular axes.

16. A digital system according to claim 15 wherein the two groups of digits are representative of angular measures of pitch and roll respectively.

17. A digital system for providing an output representation of the value of a variable that is dependent upon the values of N other variables, comprising a digital data store having a multiplicity of locations for storing digital representations of values of the dependent variable that are appropriate to a multiplicity of different combinations of values of said N variables, the different storage locations being identified by different multi-digit address-words that each comprise N ordered blocks of digits, means for sensing the values of said N variables respectively, addressing means responsive to the sensed values in combination to provide a representation of one of said address-words, the particular address-word represented identifying the location in the store of the value of said dependent variable appropriate to said combination of sensed values, and read-out names for reading out from said store the value which is stored at the storage-location identified by the represented address-word, said addressing means including N discrete stages responsive respectively to the sensed values of said N variables to provide digital representations of the sensed values, the digital representations provided by the N stages constituting representations of N discrete blocks of digits respectively, and said read-out means comprising means responsive to the digital representations provided by said N stages to read out from the store the value stored at the storage-location identified jointly by the N blocks of digits represented by those digital representations.

References Cited

UNITED STATES PATENTS

| | | | |
|---|---|---|---|
| 3,142,043 | 7/1964 | Schrimpf | 340—172.5 |
| 3,164,807 | 1/1965 | Reque | 235—150 X |
| 3,201,572 | 8/1965 | Yetter | 235—151 |
| 3,260,998 | 7/1966 | Fluegel | 235—151 |
| 3,284,778 | 11/1966 | Trauboth | 340—172.5 |

MALCOLM A. MORRISON, *Primary Examiner.*

MARTIN P. HARTMAN, *Examiner.*